United States Patent [19]

Palma

[11] 3,854,701
[45] Dec. 17, 1974

[54] FLUID MIXER
[76] Inventor: James R. Palma, 1502 Curry Rd., Schenectady, N.Y. 12306
[22] Filed: Sept. 20, 1973
[21] Appl. No.: 398,967

Related U.S. Application Data
[63] Continuation-in-part of Ser. No. 375,623, July 2, 1973, which is a continuation-in-part of Ser. No. 312,041, Dec. 4, 1972, Pat. No. 3,768,658.

[52] U.S. Cl. ................................ 259/8, 210/304
[51] Int. Cl. ............................................ B01f 7/24
[58] Field of Search ............... 259/4, 5, 6, 7, 8, 18, 259/21, 22, 23, 24, 36, 40, 41, 42, 43, 44; 210/304

[56] References Cited
UNITED STATES PATENTS

| | | | |
|---|---|---|---|
| 3,281,124 | 10/1966 | Pawlowski | 259/8 |
| 3,460,810 | 8/1969 | Mueller | 259/8 |
| 3,729,176 | 4/1973 | Reich | 259/4 |

*Primary Examiner*—Robert W. Jenkins
*Attorney, Agent, or Firm*—Oltman and Flynn

[57] ABSTRACT

A fluid mixer having a rotatable spiral conduit inside a housing, and an annular wall extending between and joining the successive turns of the conduit. The conduit has openings at the inside and outside of this wall for direct communication, respectively, with an inner chamber and an outer chamber. Various fluid inlet and outlet connections may be made to the inner and outer chambers and directly to the conduit at either end.

11 Claims, 8 Drawing Figures

PATENTED DEC 17 1974 3,854,701

SHEET 1 OF 2

FLUID MIXER

This application is a continuation-in-part of my co-pending U.S. Pat. application, Ser. No. 375,623, filed July 2, 1973, and it is a continuation-in-part of my co-pending U.S. Pat. application, Ser. No. 312,041, filed Dec. 4, 1972, now U.S. Pat. No. 3,768,658.

BACKGROUND OF THE INVENTION

In U.S. Pat. No. 3,706,383, I have disclosed and claimed a fluid separator with a rotatable spiral conduit inside a housing. The spiral conduit has interior transverse abutments positioned in the path of fluid flow through the conduit and openings near these abutments for the escape of heavier constituents of the fluid stream flowing through the rotating spiral conduit.

In my co-pending U.S. Pat. application, Ser. No. 312,041, filed Dec. 4, 1972, now U.S. Pat. No. 3,768,658, and entitled "Separator," I have disclosed and claimed a modified arrangement having an internal cylindrical wall which extends between and joins successive turns of the rotatable spiral conduit so that three fluid passageways are provided: the interior of the spiral conduit itself; the space inside the internal cylindrical wall (at the inside of the spiral turns of the conduit); and the annular space between this internal wall and the outer housing (at the outside of the spiral turns of the conduit). The spiral conduit has interior abutments and nearby openings at the outside circumference or the inside circumference, or both, of its turns to enable the separation of fluid constituents introduced into the spiral conduit, and/or into the annular space outside its turns, and/or into the generally cylindrical space inside its turns.

In my co-pending U.S. Pat. application, Ser. No. 375,623, filed July 2, 1973, and entitled "Fluid Separator or Mixer" I have disclosed and claimed another modified arrangement in which the conduit openings are formed in the interior transverse abutments themselves.

SUMMARY OF THE INVENTION

The present invention is directed to a fluid mixer which embodies various modifications in the apparatus disclosed in my aforementioned co-pending U.S. Pat. applications, and particularly in the inlet connections for supplying the different fluids that are to be mixed and the outlet connection for withdrawing the mixed fluids from the apparatus.

It is a principal object of this invention to provide a novel and improved mixer having a rotatable convoluted conduit and inner and outer chambers at the inside and outside, respectively, of the conduits's convolutions and which communicate directly with the interior of the conduit through openings in the conduit at its inside circumference and its outside circumference.

Further object and advantages of this invention will be apparent from the following detailed description of certain presently-preferred embodiments thereof with reference to the accompanying drawing in which.

Before explaining the disclosed embodiments of the present invention in detail, it is to be understood that the invention is not limited in its application to the details of the particular arrangements shown and described, since the invention is capable of other embodiments. Also, the terminology used herein is for the purpose of description and not of limitation. The term "fluid," as used herein, embraces a gas or a liquid or a particulate solid that is capable of flowing freely.

Figure 1:
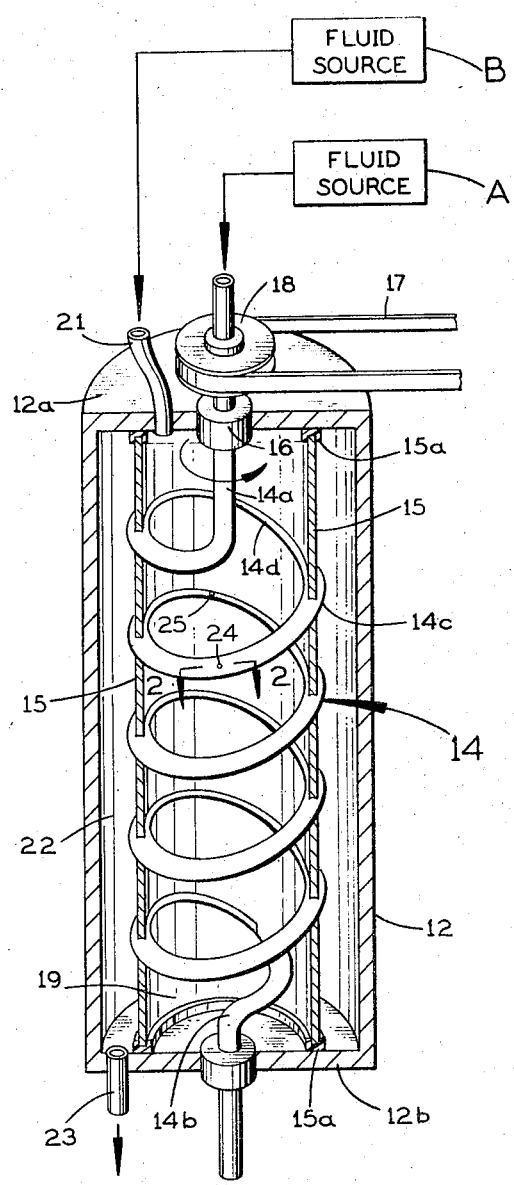
FIG. 1 is a vertical section taken centrally through an apparatus embodying the present invention.

Referring first to FIG. 1, the apparatus shown there comprises an outer housing 12, which preferably is cylindrical, and a spiral conduit 14 that is rotatable about a vertical axis extending centrally inside this housing. This conduit preferably is cylindrical in cross-section and of uniform cross-sectional diameter along its length. The convolutions or turns of the conduit preferably are of the same size and are evenly spaced apart. However, the spiral turns may be non-uniform in diameter and unequally spaced apart, if desired. Also, the conduit may be of a convoluted or serpentine shape other than spiral, if desired.

The conduit 14 has an offset, centrally located, vertical upper end 14a which is rotatably received in a bearing 16 in the horizontally disposed top wall 12a of the outer housing. Similarly, the conduit has an offset, centrally located, vertical lower end 14b which is rotatably received in a similar bearing 16 in the horizontal bottom wall 12b of the outer housing. The conduit is driven from a motor (not shown) through a belt 17 and a pulley 18 attached to its upper end above the housing 12. In the embodiment shown in FIG. 1, a source A of fluent material is connected to the upper end of conduit 14 to pass a fluid into it, preferably under pressure in addition to the force of gravity.

The apparatus also has an annular wall 15 extending between and joining the successive convolutions or turns of the conduit 14. The conduit is exposed at the inside 14d of its turns inside this annular wall 15 and also is exposed at the outside 14c of its turns outside this wall. At its upper and lower ends, the annular wall 15 has a rotatable running fit with seals 15a on the inside of the top wall 12a and the bottom wall 12b of the outer housing such that the annular wall 15 can rotate in unison with the conduit 14 inside the stationary housing 12, but there is little or no fluid leakage between the wall 15 and the housing 12 at either end.

A fluid fitting 21, which is attached in fluid-tight fashion to the top wall 12a of the outer housing 12, communicates with the generally cylindrical chamber 19 inside the annular wall 15 and inside the turns of the conduit 14. A source B of fluent material is connected to the fitting 21 to pass a fluid directly into the inner chamber 19, preferably under pressure in addition to the force of gravity.

Another fluid fitting 23, which is attached in fluid-tight fashion to the housing bottom wall 12b, communicates with the annular chamber 22 inside the outer housing 12 around the outside of the annular wall 15 and outside the turns of the conduit 14.

The conduit 14 is formed with a plurality of openings (only one of which is shown at 24 in FIG. 1) which are located on the outer circumference of the turns of the conduit, at the outside of the annular wall 15, so as to provide direct fluid communication between the interior of the conduit 14 and the annular chamber 22. Preferably, these openings are evenly spaced apart at desired intervals along the spiral length of the conduit 14.

On the inside circumference of its turns, the conduit 14 is formed with a plurality of openings (only one of which is shown at 25 in FIG. 1) at the inside of the annular wall 15. These openings 25 provide direct fluid communication between the inner chamber 19 and the interior of the conduit 14.

In the embodiment illustrated in FIG. 1, a first fluent substance (from source B) is introduced into the inner chamber 19 through the fitting 21 at its upper end, and a second fluent substance (from source A) is introduced directly into the interior of the conduit 14 at its upper end. The lower end of conduit 14 is closed. The first fluent substance flows through the conduit openings 25 at the inside of annular wall 15 into the interior of the conduit 14, where it mixes with the second fluent substance therein. The mixed fluids then are discharged centrifugally through the conduit openings 24 at the outside of wall 15 into the outer chamber 22, from which they are withdrawn through the outlet fitting 23 at the bottom.

If desired, the fluid from source A may be introduced into both the upper and lower ends of conduit 14 in FIG. 1.

Figure 5:
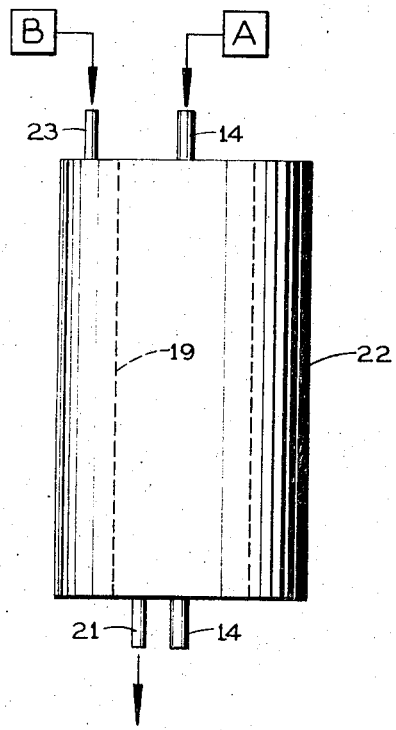
FIGS. 5, 6, 7 and 8 are elevational views respectively showing the present apparatus with four different fluid inlet and withdrawal arrangements.

Alternatively, one fluid may be introduced through fitting 23 directly into the outer chamber 22 and the other directly into one end of conduit 14, and the mixed fluids may be withdrawn from the inner chamber 19, through fitting 21. In that event, the fitting 23 should be at the top wall 12a of the housing 12 and connected to the fluid source B, and the fitting 21 should be at the bottom wall to pass the mixed fluids from the apparatus, as shown in FIG. 5.

Figure 6:
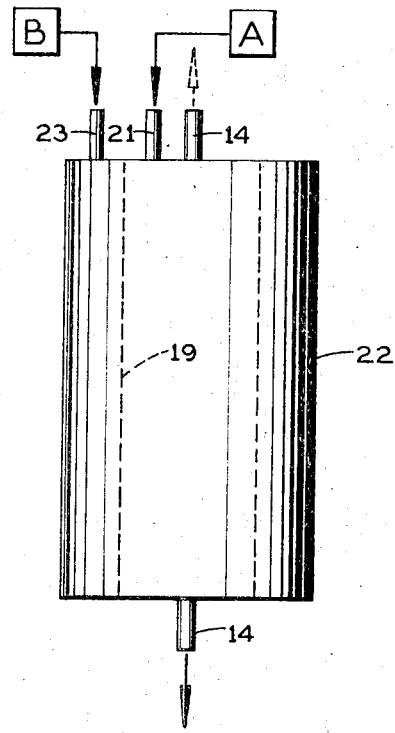

In another alternative embodiment, shown in FIG. 6, one fluid is introduced through fitting 23 directly into the outer chamber 22 and the other through fitting 21 directly into the inner chamber 19. Both fluids pass into the interior of the conduit 14 through the respective outer openings 24 and inner openings 25 in the latter, and the mixed fluids may be withdrawn from the lower end of this conduit. In this alternative embodiment, the upper end of conduit 14 preferably is closed. However, if desired, in certain cases the mixed fluids may be withdrawn from the upper end of conduit 14, as well as from its lower end.

Figure 7:
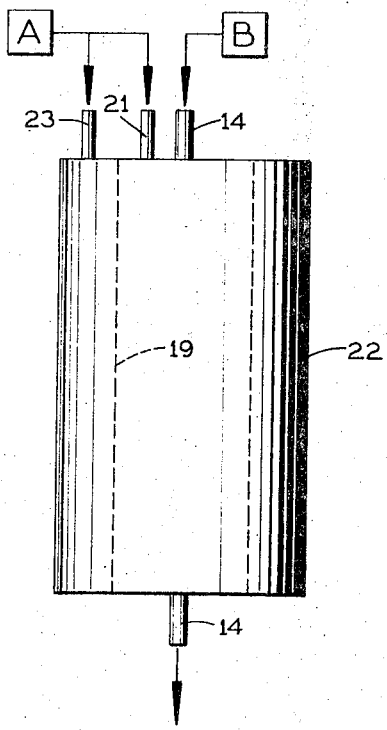

In yet another embodiment, shown in FIG. 7, one fluid is introduced through fittings 21 and 23 directly into both the inner and outer chambers 19 and 22, and the other fluid is introduced directly into one end of the conduit 14, where it mixes with the fluid coming through the conduit openings 25 and 24 from the inner and outer chambers 19 and 22. The mixed fluids are withdrawn from the opposite end of the conduit.

Figure 8:
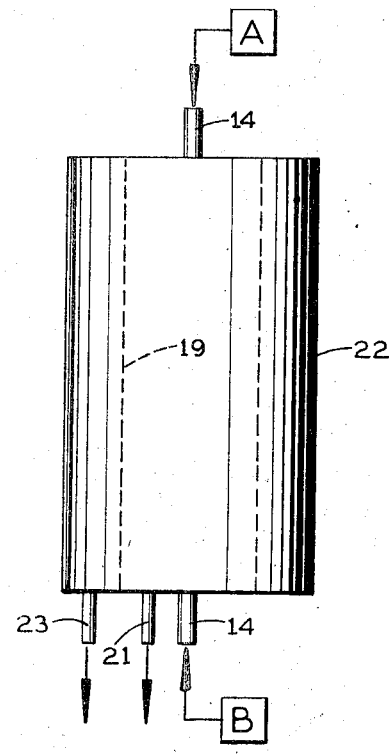

In still another embodiment, shown in FIG. 8, one fluid is introduced directly into the upper end of conduit 14 and the other fluid is introduced directly into the lower end of the conduit, and the mixed fluids pass out of the interior of the conduit through openings into the outer chamber 22 or the inner chamber 19, or both, and the mixed fluids are then withdrawn through one or both fittings 21 and 23 from the chamber or chambers that have received them.

As already mentioned, the conduit 14 may have a convoluted or serpentine shape other than spiral, but which provides segments that extend back and forth on opposite sides of the rotational axis of the conduit.

To improve the mixing action by creating turbulence, the conduit 14 may have internal abutments at or near the openings 24, 25 in one or both of its outer and inner circumferential walls.

Figure 2:
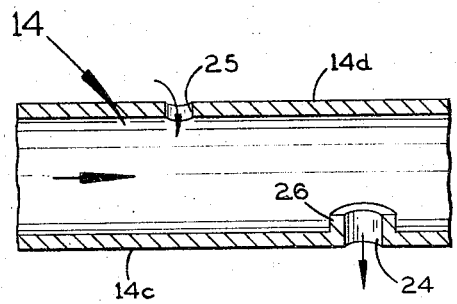
FIG. 2 is an enlarged section taken longitudinally along the spiral conduit in this apparatus, at the line 2 — 2 in FIG. 1 and showing one embodiment of internal transverse abutments and openings in the conduit.

In the embodiment shown in FIG. 2, the outer circumferential wall 14c of the conduit (at the outside of the annular connecting wall 15) is formed with a generally cylindrical, inwardly projecting abutment 26 in which each opening 24 is located centrally. As shown in that Figure, each opening 25 in the inner circumferential wall 14d of the conduit is simply a circular opening and there is no internal abutment at this opening. However, if desired, abutments similar to those shown at 26 may be provided around each opening 25. Also, the shape of these internal transverse abutments may differ from the cylindrical shape shown.

Figure 3:
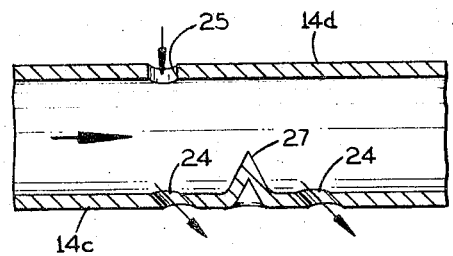
FIG. 3 is a view similar to FIG. 2 but showing a modified configuration of the interior abutment and openings in the spiral conduit.

FIG. 3 shows another embodiment in which the internal abutment 27 is conical and is located midway between a pair of openings 24 in the outer circumferential wall 14c of the conduit, and these openings are inclined outwardly in the direction of fluid flow lengthwise inside the circuit. The inner circumferential wall 14d of the conduit does not have such internal abutments adjacent the openings 25, but such abutments could be provided there, if desired. Also, the shape of the internal abutments could be any desired configuration.

Figure 4:
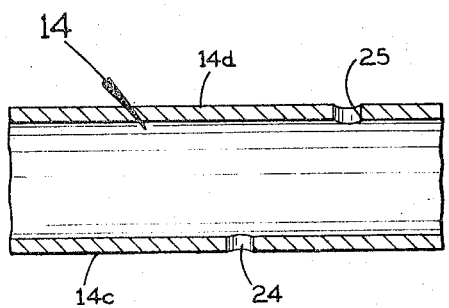
FIG. 4 is a view similar to FIGS. 2 and 3 but showing a different arrangements in which the conduit has openings but no interior abutments.

FIG. 4 shows a simplified embodiment in which the conduit 14 does not have internal abutments at or near the openings 24 in its outer circumferential wall 14c or the openings 25 in its inner circumferential wall 14d.

Also, it is to be understood that the rotary movement imparted to the convoluted conduit 14 need not be continuous rotation in one direction only. It may be back-and-forth rotation, first in one direction and then in the opposite direction, and the speeds in the opposite directions may be equal or unequal, as desired.

I claim:

1. In a fluid mixer having an outer housing, and a convoluted conduit inside said outer housing, the improvement which comprises:

an annular wall inside said housing which extends between and joins the successive convolutions of said conduit and provides therewith a first chamber at the inside of said convolutions, and together with said housing and said convolutions provides a second chamber at the outside of said convolutions;

said conduit having openings at the inside of its convolutions which communicate directly with said first chamber and having openings at the outside of its convolutions which communicate directly with said second chamber;

means for introducing first and second fluids under pressure into said conduit to mix with each other inside said conduit;

and means for withdrawing the mixed fluids from the interior of the conduit.

2. A mixer according to claim 1, wherein the first fluid is introduced directly into one of said chambers to enter into said conduit at the openings therein which communicate with said one chamber, and the second fluid is introduced directly into one end of the conduit.

3. A mixer according to claim 2, wherein the first fluid is introduced into said first chamber.

4. A mixer according to claim 2, wherein the first fluid is introduced into said second chamber.

5. A mixer according to claim 2, wherein said means for withdrawing takes the mixed fluids from the opposite end of the conduit.

6. A mixer according to claim 2, wherein the first fluid is introduced into both said first and second chambers, and said means for withdrawing takes the mixed fluids from the opposite end of the conduit.

7. A mixer according to claim 2, wherein said means for withdrawing takes the mixed fluids from the outer of said chambers after passing through the conduit openings which communicate directly with said other chamber.

8. A mixer according to claim 1, and further comprising:

means for introducing said other fluid under pressure into the other of said chambers to enter into the conduit at the openings therein which communicate directly with said other chamber;

and wherein said means for withdrawing takes the mixed fluids from one end of the conduit.

9. A mixer according to claim 8, wherein the opposite end of the conduit is closed.

10. A mixer according to claim 9, wherein said means for withdrawing takes the mixed fluids from both ends of the conduit.

11. A mixer according to claim 1, wherein the first and second fluids are introduced directly respectively into opposite ends of the conduit to mix therein and pass out through openings in the conduit, and said means for withdrawing takes the mixed fluids from one of said chambers.

* * * * *